Figure 1:
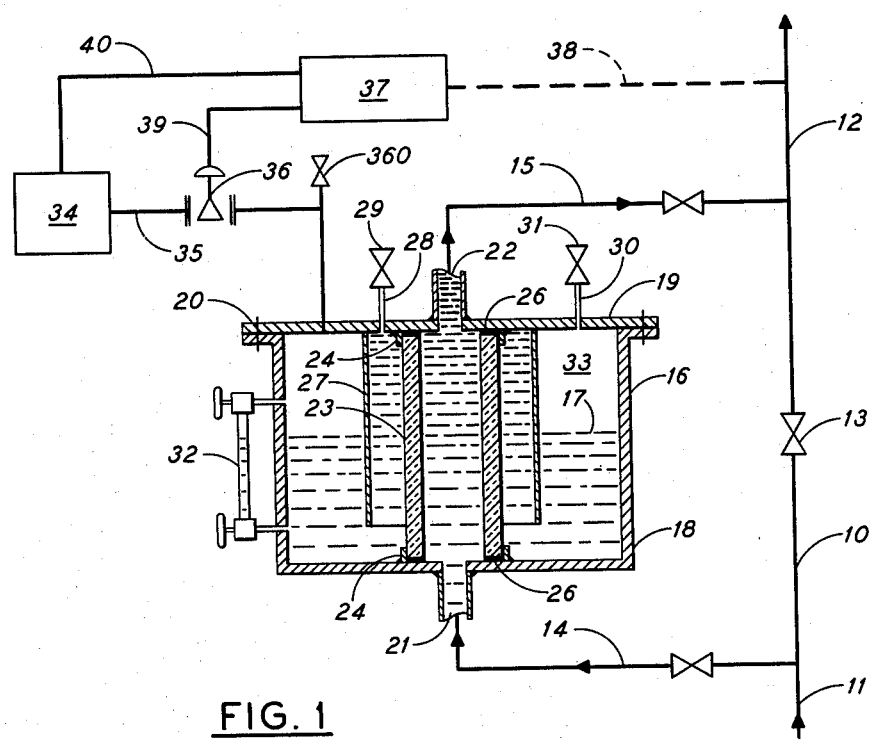

July 15, 1958

H. H. GILMAN 2,843,138

LIQUID PROPORTIONER

Filed Dec. 27, 1954

INVENTOR
HARRIS H. GILMAN

BY
ATTORNEYS

United States Patent Office 2,843,138
Patented July 15, 1958

2,843,138

LIQUID PROPORTIONER

Harris H. Gilman, Palo Alto, Calif., assignor, by mesne assignments, to California Research Corporation, San Francisco, Calif., a corporation of Delaware Application December 27, 1954, Serial No. 477,611

5 Claims. (Cl. 137—93)

This invention relates to the control of the flow of liquid of higher concentration, such as strong acids, bases, salts, and the like solutions into a stream of liquid of lower concentration, for example, water, and particularly appertains to the accurate control of small rates of flow of such liquids in the laminar range in response to a physical or chemical condition, such as pH, of the lower concentration liquid stream or the final mixture.

Heretofore, such methods and apparatus that have been proposed for this purpose utilize control valves, small orifices, restricted conduits and the like, which tend to become corroded or to be clogged by impurities that are unavoidably present in systems of this nature. An example of such a system is illustrated in U. S. Patent 2,604,108 of July 22, 1952, to D. M. Considine. Since the rate of flow through such methods and apparatus is in the turbulent range and hence varies as the square root of the pressure drop across the orifice, for example, any clogging requires very high pressure drops to maintain flow at the required rates.

This invention, however, comprehends broadly the utilization of two properties of a porous barrier: First, the flow of a fluid through porous media is generally laminar in nature. This results in a flow rate that is substantially directly proportional to the pressure drop through the medium. Second, if a porous barrier is placed between two solutions of different concentrations, the fluid of lower concentration will tend to pass through the barrier toward the higher concentration fluid. Thus, if there were no pressure differential across such a barrier, for example, that exerted by a difference in hydrostatic head between the two liquids, the lower concentration liquid would tend to flow toward that of higher concentration. This property, together with other features of the invention which will become apparent is utilized to produce small and exceeding closely controlled flow rates in the opposite direction, i. e., from the higher toward the lower concentration, wherein very small flow quantities per unit time are obtainable with a desirable pressure-flow rate characteristic, a minimum of equipment, a maximum of reliability, and for long periods of time without shut-downs for adjustment or cleaning of the several parts of the equipment.

It is an object of this invention to provide a method and means for accurately proportioning the flow of a liquid of higher concentration, e. g., a strong acid, into a liquid of lower concentration, e. g., boiler feed water, in response to a condition desired to be established at a substantially constant value or within a narrow range, e. g., a predetermined pH (hydrogen ion concentration) of the mixture.

Another object is to provide a method and means for accurately proportioning the flow of one liquid of the nature discussed above, into another liquid of different composition at exceedingly low flow rates, which are essential in certain circumstances, and without the use of the usual valves, orifices, restricted conduits, and the like heretofore employed.

Another object is to provide a simple flow controller of the type described, using the particular flow properties of a barrier, diaphragm or tube of a porous corrosion-resistant material for the intended purpose.

These and other objects and advantages will be further apparent from the following description of a preferred embodiment of the invention, together with an alternative form, as illustrated in the attached drawing, which forms a part of this specification.

In the drawing, Figure 1 is a diagrammatic and part sectional view of a preferred arrangement of the invention, as applied to a boiler feed water treating system.

Figure 2:
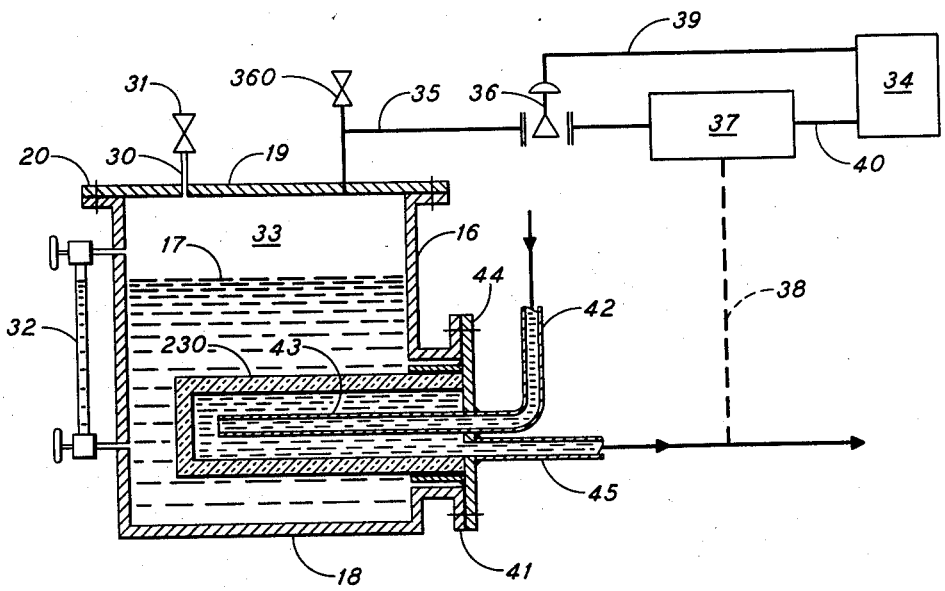

Figure 2 is a diagrammatic and part sectional view of an alternative form, in which all of the lower concentration stream passes through the feeding unit.

Referring to the drawing and particularly to Figure 1, reference numeral 10 designates a conduit forming part of the feed water system of a steam boiler plant, wherein treated or untreated water enters conduit 10 at 11 from a suitable source (not shown) and leaves at 12 to pass to a further treatment or to be introduced into a steam boiler. A valve 13 or other flow-restricting device is placed in conduit 10 to set up a slight pressure differential between valved connections 14 and 15, which connect with a closed vessel 16 and permit a predetermined proportion of the water passing through conduit 10 to be diverted or by-passed through the vessel for treatment, and thereafter returned to that conduit.

In this example, vessel 16 forms a storage reservoir for the higher concentration liquid 17, e. g., sulfuric acid, and is made of or lined with a material suitable for such service. In general, it comprises a body 18, provided with a removable cover 19 secured by bolted flanges 20. An inlet connection 21 and an outlet connection 22 are aligned and are joined, respectively, with pipe connections 14 and 15 mentioned above. Secured between cover 19 and the bottom of body 18 is a porous hollow cylinder or tube 23, of a suitable material, such as porcelain, silicon carbide, or carbon, desirably aligned by rings 24 and 25 and sealed by gaskets 26. Surrounding tube 23 is a sleeve 27, extending downwardly from cover 19 to a point near the bottom of the chamber formed by vessel 16. An air bleeder connection 28 with a valve 29 permits air or gas accumulating in the annulus between tube 23 and sleeve 27, to be removed, so that the full length of the tube is covered by the liquid 17. An appropriate filling connection 30 with a valve 31 is provided for the introduction, either manually or automatically, of the higher concentration liquid 17 into vessel 16, and its level is indicated by a gage glass 32.

The control of the hydrostatic head of the gas 33, usually air, above the liquid 17 in vessel 16, is effected by air from storage tank 34, which is connected by line 35 and valve 36 to the top of vessel 16 and exerts a pressure sufficiently higher than the sum of the osmotic pressure through the porous barrier and the pressure existing within tube 23 to force liquid 17 through the wall of that tube into the stream of liquid flowing therethrough. The control of that pressure differential may be carried out in various ways, and the present example shows a conventional pH-responsive unit 37 having an appropriate sensing or communication lead 38 to conduit 10 at a point downstream of connection 15, with a control lead 39 to the valve 36 to vary the opening of that valve in accordance with the requirement of the system for the addition of liquid 17 to that liquid flowing in conduit 10 and the by-pass through tube 23.

Usually, such units are air-actuated, so that an appropriate connection 40 is shown leading from tank 34 to the pH-responsive device. Also, line 35 is provided with the usual small leak or bleeder valve 360 to improve the control function of valve 36.

The alternative form of this invention, illustrated in Figure 2, differs in arrangement from that just described. In this embodiment, the main body of liquid to which the reagent or concentrated solution 17 is to be added passes through the conduit means forming the porous baffle. Instead of being placed vertically in the chamber formed by vessel 16 and provided with a sleeve to maintain full contact of the liquid 17 with the porous element in Figure 1, the porous member is formed as a tube 230 with a closed end, and is supported entirely below the normal level of the liquid 17 by a flanged nozzle 41 at the side of shell 18. A liquid inlet connection 42, with an axial extension 43, conveys the main liquid stream through flange 44 to the inner end of tube 230, from which it returns in contact with the tube to an outlet connection 45. The remainder of the system uses the same arrangement of a pH-responsive unit 37, with a communication lead 38 to outlet connection 44, an air storage tank 34, valve 36, lead 39, and connection 40, as already described for Figure 1.

In operation, the phenomenon mentioned above, viz., the property of a porous barrier to cause the lower concentration solution or liquid to tend to flow toward the higher concentration, will prevent any flow of the liquid 17 into the lower concentration liquid within tube 23 or 230 until an adequate pressure differential is imposed across that tube by the hydrostatic head of gas 33, under the control of the condition-responsive unit 37. Thereafter, the amount of liquid 17 to be added is automatically varied in the laminar range by that unit to meet the desired value to be maintained in the system. The clogging of the porous barrier which may occur over an extended period of time does not affect the operation of the mechanism up to the limit of the available gas supply pressure in storage tank 34 so that the system remains in adjustment and operative, although the pressure of gas 33 may be increased by valve 35 over that originally set.

In conclusion, it will be understood that numerous changes and modifications could be made in the illustrative examples shown and described above, without departing from the essential features of the invention as defined in the appended claims, and all such that fall within their scope are intended to be embraced thereby.

I claim:

1. A liquid flow proportioner of the type described comprising means forming a closed reservoir for a first liquid of higher concentration, a substantially vertical tube of porous material sealed in said reservoir, an inlet and an outlet for said reservoir aligned with said tube and adapted to convey a stream of a second liquid of lower concentration through said tube, a sleeve in said reservoir enclosing the upper portion of said tube and communicating at its lower end with said reservoir below the level of liquid therein, and means for imposing hydrostatic pressure on the liquid in said reservoir that is greater than the hydrostatic pressure in said tube to force said first liquid through said porous tube into said second liquid stream, said tube being the only means whereby said first liquid is transferred into said second liquid.

2. A liquid flow proportioner according to claim 1, in which the hydrostatic pressure imposing means is responsive to variations in a condition of said second liquid stream.

3. A liquid flow proportioner according to claim 1, with the addition of a source of fluid pressure, a valve connecting said source to said reservoir, and means responsive to a condition of said second liquid stream beyond said tube for controlling said valve.

4. A liquid flow proportioner according to claim 1, with the addition of a source of gas under pressure, flow control means connecting said source to said reservoir above the liquid therein, and means responsive to the pH of the second liquid stream beyond said tube for controlling said flow control means.

5. A liquid flow proportioner of the type described comprising means forming a closed reservoir for a first liquid of higher concentration, a closed tube of porous material sealed in said reservoir and entirely surrounded by said first liquid, an inlet and an outlet for said reservoir communicating only with the interior of said tube and adapted to convey a stream of a second liquid through said tube, and means for imposing hydrostatic pressure on the liquid in said reservoir that is greater than the hydrostatic pressure in said tube to force said first liquid through said porous tube into said second liquid stream, said tube being the only means whereby said first liquid is transferred into said second liquid.

References Cited in the file of this patent

UNITED STATES PATENTS

| | | |
|---|---|---|
| 1,759,996 | Parker | May 27, 1930 |
| 1,825,631 | Harvath | Sept. 29, 1931 |
| 1,946,474 | Banks et al. | Feb. 13, 1934 |
| 2,218,533 | Huebotter | Oct. 22, 1940 |
| 2,311,532 | Gershon | Feb. 16, 1943 |
| 2,358,748 | Thompson | Sept. 19, 1944 |
| 2,360,020 | Skinner et al. | Oct. 10, 1944 |
| 2,468,603 | Pew | Apr. 26, 1949 |
| 2,604,108 | Considine | July 22, 1952 |